US012803233B2

(12) United States Patent
Bordewyk et al.

(10) Patent No.: US 12,803,233 B2
(45) Date of Patent: Nov. 17, 2026

(54) POWER RECEPTACLE ASSEMBLY

(71) Applicant: Light Corp Inc., Grand Haven, MI (US)

(72) Inventors: Joshua A. Bordewyk, Grand Haven, MI (US); Nicholas B. Masters, Grand Rapids, MI (US); Mitchell R. Brush, Spring Lake, MI (US); Gregory Swears, Nunica, MI (US)

(73) Assignee: Light Corp Inc., Grand Haven, MI (US)

( * ) Notice: Subject to any disclaimer, the term of this patent is extended or adjusted under 35 U.S.C. 154(b) by 184 days.

(21) Appl. No.: 18/743,396

(22) Filed: Jun. 14, 2024

(65) Prior Publication Data

US 2024/0413598 A1 Dec. 12, 2024

Related U.S. Application Data

(63) Continuation of application No. 17/478,323, filed on Sep. 17, 2021, now Pat. No. 12,015,228.

(51) Int. Cl.
*H01R 27/02* (2006.01)
*H01R 13/447* (2006.01)
(Continued)

(52) U.S. Cl.
CPC ........... *H01R 27/02* (2013.01); *H01R 13/447* (2013.01); *H01R 13/665* (2013.01); *H01R 24/78* (2013.01);
(Continued)

(58) Field of Classification Search
None
See application file for complete search history.

(56) References Cited

U.S. PATENT DOCUMENTS 3,049,688 A * 8/1962 Sinopoli .............. H01R 25/006 220/3.9
D249,063 S 8/1978 James
(Continued)

FOREIGN PATENT DOCUMENTS

CN 207303552 U 5/2018
CN 306140735 S 10/2020
(Continued)

OTHER PUBLICATIONS

"Nik Power Unit", Retrieved from internet. https://www.youtube.com/watch?v=2PrZfYmDeSw, May 30, 2023.
(Continued)

*Primary Examiner* — Tho D Ta
(74) *Attorney, Agent, or Firm* — Bodman PLC

(57) ABSTRACT

A power receptacle assembly includes a base unit which includes a housing. The housing includes a bottom housing, a housing cover coupled to the bottom housing and first and second end caps coupled to the bottom housing and the housing cover. The bottom housing, the housing cover, and the first and second end caps define a housing interior. The base unit also includes a constant voltage driver disposed within the housing interior. Additionally, the power receptacle assembly includes a plurality of power receptacles electronically coupled to the constant voltage driver though the housing. The power receptacle assembly also a secondary unit including a housing defining an interior, a sled coupled to another power receptacle configured to be disposed within the housing interior and a clamp.

14 Claims, 13 Drawing Sheets

(51) Int. Cl.

| | |
|---|---|
| ***H01R 13/66*** | (2006.01) |
| ***H01R 24/78*** | (2011.01) |
| ***H01R 25/00*** | (2006.01) |
| ***H02J 3/02*** | (2006.01) |

(52) U.S. Cl.

CPC ......... *H01R 25/003* (2013.01); *H01R 25/006* (2013.01); *H02J 3/02* (2013.01)

(56) References Cited

U.S. PATENT DOCUMENTS

| | | | | |
|---|---|---|---|---|
| D256,581 | S | 8/1980 | Bartin | |
| 4,667,460 | A | 5/1987 | Kramer | |
| 5,744,750 | A * | 4/1998 | Almond | H02G 3/185<br>174/547 |
| D413,571 | S | 9/1999 | Glass | |
| 6,004,157 | A | 12/1999 | Glass | |
| 6,220,880 | B1 * | 4/2001 | Lee | H01R 25/003<br>439/535 |
| 6,379,182 | B1 | 4/2002 | Byrne | |
| 6,717,053 | B2 | 4/2004 | Rupert | |
| 6,971,911 | B2 | 12/2005 | Ramsey et al. | |
| D559,782 | S | 1/2008 | Slasinski | |
| 7,358,625 | B2 | 4/2008 | Cheng et al. | |
| D579,873 | S | 11/2008 | Gershfeld | |
| 7,663,866 | B2 | 2/2010 | Lee et al. | |
| 7,688,564 | B2 | 3/2010 | Byrne | |
| 7,772,718 | B2 | 8/2010 | Lee et al. | |
| D632,258 | S | 2/2011 | Sumida | |
| 8,350,406 | B2 | 1/2013 | Byrne et al. | |
| 8,444,432 | B2 | 5/2013 | Byrne et al. | |
| 8,480,429 | B2 | 7/2013 | Byrne | |
| 8,680,709 | B2 | 3/2014 | Byrne et al. | |
| D721,712 | S | 1/2015 | Byrne et al. | |
| D740,228 | S | 10/2015 | Page et al. | |
| D740,229 | S | 10/2015 | Page et al. | |
| 9,219,339 | B2 | 12/2015 | Lai | |
| D752,517 | S | 3/2016 | Scott et al. | |
| 9,288,924 | B2 | 3/2016 | Page | |
| 9,312,673 | B2 | 4/2016 | Byrne et al. | |
| 9,368,924 | B2 | 6/2016 | Byrne et al. | |
| D761,732 | S | 7/2016 | Byrne et al. | |
| D761,733 | S | 7/2016 | Sumwalt et al. | |
| D762,175 | S | 7/2016 | Byrne et al. | |
| 9,392,869 | B2 | 7/2016 | Byrne et al. | |
| D788,039 | S | 5/2017 | Page et al. | |
| 9,710,025 | B2 | 7/2017 | Scott et al. | |
| D798,818 | S | 10/2017 | Kondas | |
| D799,428 | S | 10/2017 | Kondas | |
| D801,936 | S | 11/2017 | Rose | |
| D801,937 | S | 11/2017 | Rose | |
| D804,419 | S | 12/2017 | Hayes et al. | |
| D812,009 | S | 3/2018 | Hayes et al. | |
| 9,912,154 | B2 | 3/2018 | Fleisig | |
| D816,037 | S | 4/2018 | Byrne et al. | |
| D821,328 | S | 6/2018 | Byrne et al. | |
| D827,579 | S | 9/2018 | Byrne et al. | |
| 10,116,094 | B2 * | 10/2018 | Byrne | H01R 13/703 |
| D837,160 | S | 1/2019 | Byrne et al. | |
| D840,347 | S | 2/2019 | Byrne et al. | |
| D848,371 | S | 5/2019 | Byrne et al. | |
| D849,686 | S | 5/2019 | Byrne et al. | |
| D856,284 | S | 8/2019 | Byrne et al. | |
| D856,937 | S | 8/2019 | Rupert | |
| D857,633 | S | 8/2019 | Byrne et al. | |
| D869,397 | S | 12/2019 | Hayes et al. | |
| D874,404 | S | 2/2020 | Byrne et al. | |
| D877,091 | S | 3/2020 | Rath et al. | |
| D880,432 | S | 4/2020 | Tang | |
| 10,621,113 | B2 * | 4/2020 | Byrne | H01R 24/78 |
| D887,363 | S | 6/2020 | Byrne et al. | |
| 10,811,809 | B2 * | 10/2020 | Byrne | H01H 9/02 |
| D902,862 | S | 11/2020 | Rupert | |
| D905,644 | S | 12/2020 | Byrne et al. | |
| 10,873,167 | B2 * | 12/2020 | Byrne | H01R 25/006 |
| D924,805 | S | 7/2021 | Luo | |
| 11,081,844 | B2 * | 8/2021 | Byrne | H01R 27/02 |
| D930,591 | S | 9/2021 | Rupert | |
| D931,817 | S | 9/2021 | Byrne et al. | |
| D932,442 | S | 10/2021 | Rajasekaran | |
| D948,446 | S | 4/2022 | Helms | |
| D954,653 | S | 6/2022 | Byrne et al. | |
| D970,449 | S | 11/2022 | Valley | |
| D976,834 | S | 1/2023 | Duan | |
| D984,389 | S | 4/2023 | Pan | |
| D986,180 | S | 5/2023 | Bordewyk et al. | |
| D986,181 | S | 5/2023 | Bordewyk et al. | |
| D1,010,582 | S | 1/2024 | Bosch et al. | |
| D1,011,296 | S | 1/2024 | Bosch et al. | |
| D1,030,677 | S | 6/2024 | Li | |
| D1,085,020 | S | 7/2025 | Byrne et al. | |
| D1,095,440 | S | 9/2025 | Smith | |
| D1,134,206 | S | 7/2026 | Genau et al. | |
| 2004/0053535 | A1 | 3/2004 | Liu | |
| 2015/0303821 | A1 | 10/2015 | Lee et al. | |
| 2019/0341712 | A1 | 11/2019 | Byrne et al. | |
| 2020/0028342 | A1 | 1/2020 | Byrne et al. | |
| 2020/0388971 | A1 * | 12/2020 | Byrne | H01B 7/06 |
| 2021/0005989 | A1 | 1/2021 | Byrne et al. | |
| 2022/0271484 | A1 | 8/2022 | Bordewyk et al. | |
| 2023/0087141 | A1 | 3/2023 | Bordewyk et al. | |

FOREIGN PATENT DOCUMENTS

| | | | | |
|---|---|---|---|---|
| CN | 306161722 | S | 11/2020 | |
| CN | 112787148 | A * | 5/2021 | H01R 13/502 |
| CN | 306654545 | S | 7/2021 | |
| DE | 202020002181 | U1 | 7/2020 | |
| JP | 1525895 | S | 6/2015 | |

OTHER PUBLICATIONS

"Edgemount Power Dock", Retrieved from internet, https://www.mockett.com/media/pdf/technical/PCS124B-CLMP_technical.pdf, Oct. 20, 2021.

"Undermount Power Dock", Retrieved from internet, https://www.mockett.com/media/pdf/technical/PCS124C-UNMT_technical.pdf, Oct. 15, 2021.

* cited by examiner

POWER RECEPTACLE ASSEMBLY

CROSS-REFERENCE TO RELATED APPLICATIONS

The application is a continuation application of U.S. non-provisional application Ser. No. 17/478,323, filed on Sep. 17, 2021, the content of which is incorporated herein by reference in its entirety.

TECHNICAL FIELD

The present disclosure relates generally to power receptacle assemblies, subassemblies, and components thereof.

BACKGROUND

While known power receptacle assemblies, subassemblies, and components thereof have proven to be acceptable for various applications, such power receptacle assemblies, subassemblies, and components thereof are nevertheless susceptible to improvements that may enhance their overall performance and cost. Therefore, a need exists to develop power receptacle assemblies, subassemblies, and components thereof that advance the art.

SUMMARY

The present disclosure provides a power receptacle assembly that includes a base unit that connects to a power source and is mounted at a first location on a work station, such as below an upper work surface of a desk or table. The base unit includes a power supply, such as an AC/DC converter, that operates to covert line voltage (e.g., 120V or 240V) to a low voltage output (e.g., 12V or 24V), such as to be capable of delivering the low voltage power to a general purpose DC receptacle. The power supply may be electrically connected with a low voltage power receptacle at the base unit or at a secondary unit. In some examples, a secondary unit may be electrically connected to the base unit and placed on or mounted to a second location on the work station, such as a location that is accessible at or above the upper work surface of the work station. The base unit and the secondary unit each provide electrical receptacles that are powered by the power source. Having the power supply disposed or integrated in the housing of the base unit provides the power supply in an easy to mount housing that provides a compact and enhanced performance power receptacle assembly.

According to one aspect of the present disclosure, a power receptacle assembly includes a base unit configured to be coupled to an under side of a work station. The base unit includes a base housing defining a housing interior, a constant voltage driver disposed within the housing interior, and a face plate disposed at opening of a front side of the housing interior. The base unit also includes an AC power receptacle disposed at the base housing and electronically coupled to the constant voltage driver in the housing, with the AC power receptacle accessible at the face plate. Additionally, the base unit includes a DC power receptacle disposed at the base housing and electronically coupled to the constant voltage driver in the housing interior, with the DC power receptacle accessible at the face plate and a base power cord extending through the base housing and electrically connected to the constant voltage driver, the base power cord configured to be electrically connected to a power source. Moreover, the base unit includes a separator disposed between the AC power receptacle and the DC power receptacle.

According to one aspect of the present disclosure, a power receptacle assembly includes a base unit which includes a housing. The housing includes a bottom housing, a housing cover coupled to the bottom housing and first and second end caps coupled to the bottom housing and the housing cover. The first and second end caps are configured to be coupled to an under side of a work station. Moreover, the bottom housing, the housing cover, and the first and second end caps define a housing interior. The base unit also includes a constant voltage driver disposed within the housing interior. Additionally, the power receptacle assembly includes a plurality of power receptacles electronically coupled to constant voltage driver though the housing. The power receptacle assembly also includes a face plate coupled to the housing and including a first jack configured to be coupled to an electronic device for use on the work station, a back plate coupled to the housing and including a second jack configured to be coupled to an electronic device for use on the work station, and a power cord configured to be coupled to a source of electrical power. In addition, the power receptacle may include a secondary unit electrically coupled to the base unit and configured to be mounted to a second location of the work station. The secondary unit may include a housing, a face plate coupled to the housing, a back plate coupled to the housing, and a clamp coupled to the housing and configured to secure the secondary unit on the mounting surface of the work station.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference symbols in the various drawings indicate like elements.

DETAILED DESCRIPTION

Figure 1A:
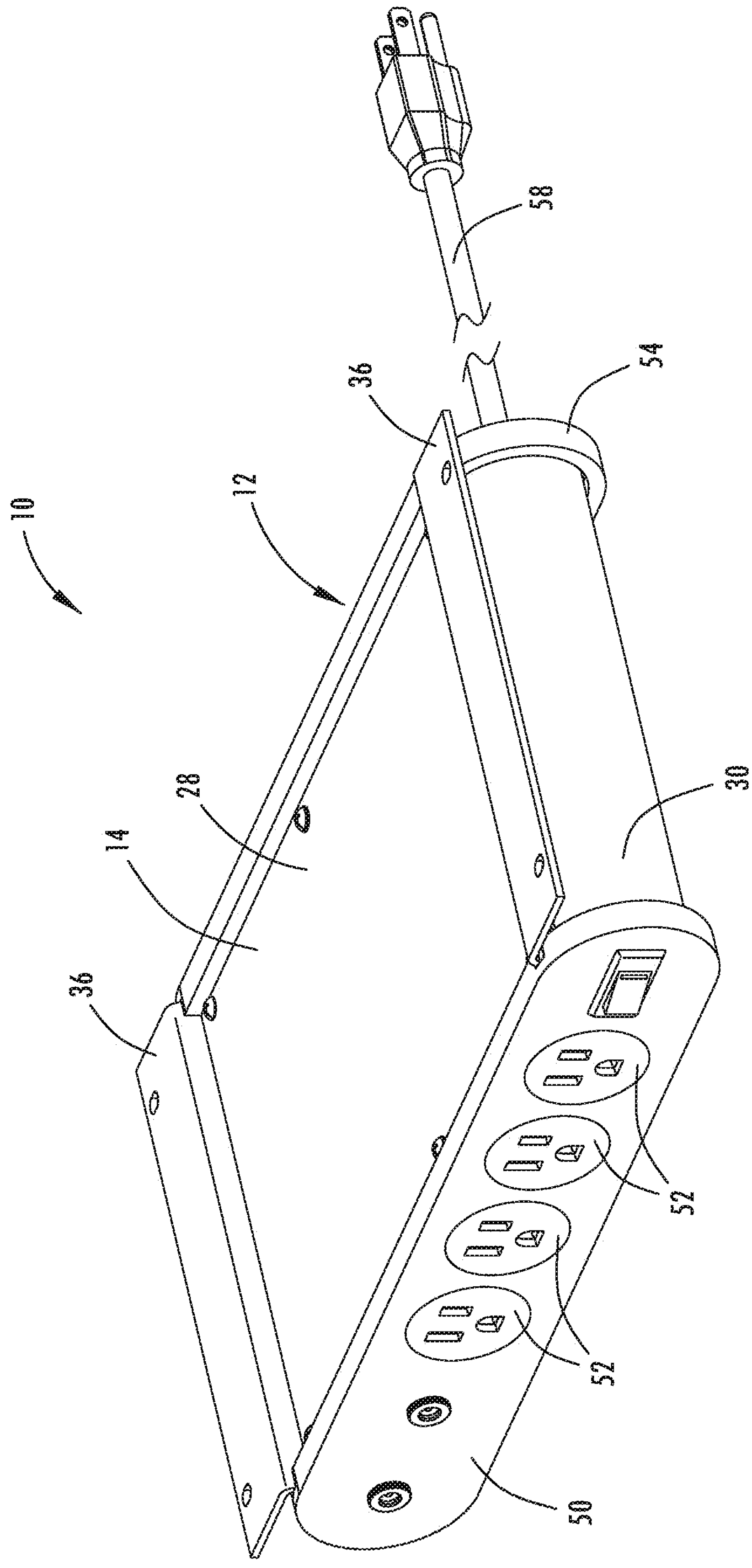
FIG. 1A is perspective view of a base unit of the power receptacle assembly.
Figure 1B:
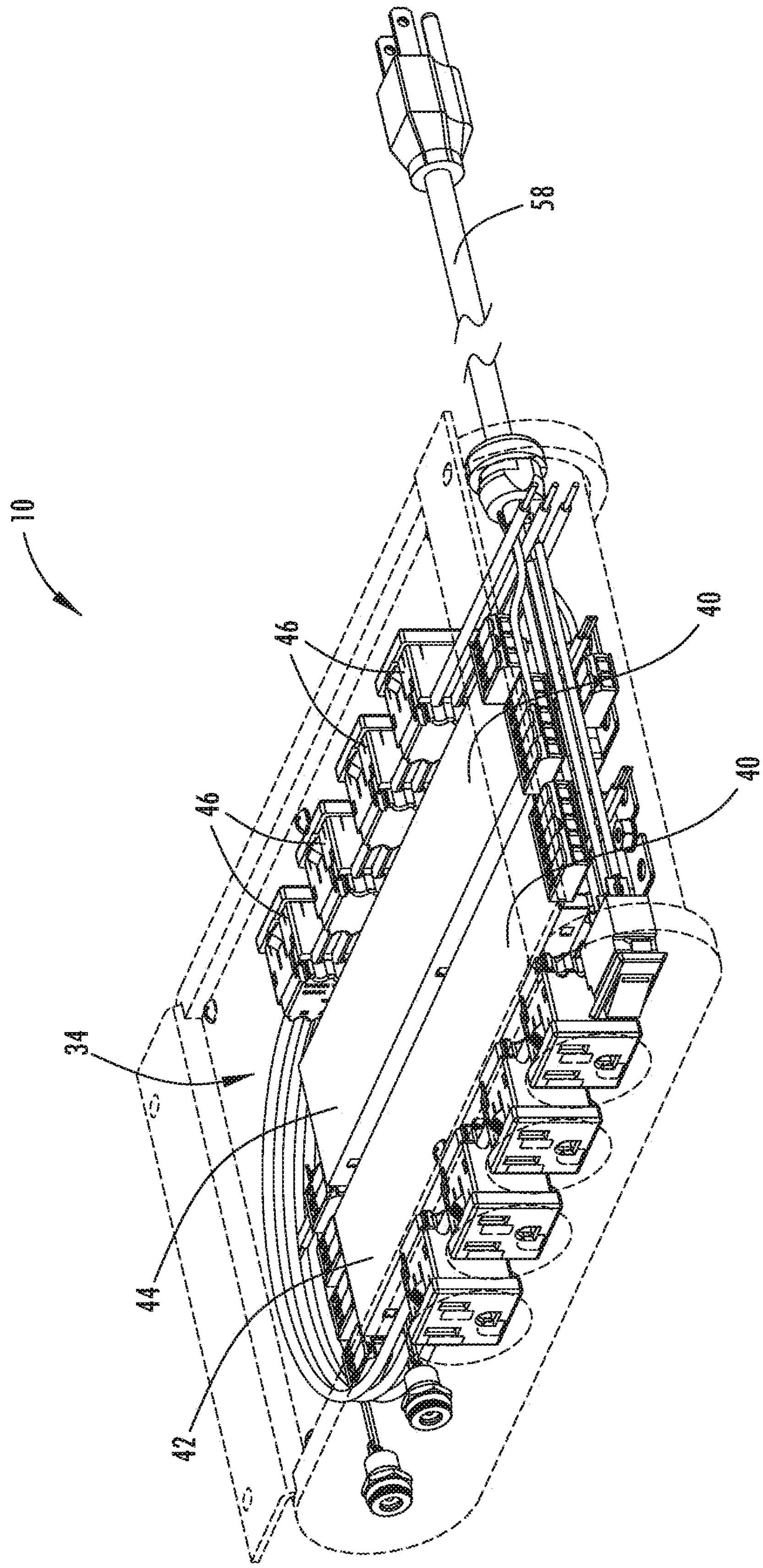
FIG. 1B is perspective view of the base unit of FIG. 1A showing the housing, the face plate, and the back plate in phantom.

Referring now to the drawings and the illustrative examples depicted therein, a power receptacle assembly is generally disclosed at reference numeral 10. The power receptacle assembly 10 is configured to provide power to an electronic device on a work station. In one example, the work station may be an office desk or conference table, however, the work station may also be any surface configured to hold an electronic device. The power receptacle assembly 10 may be mounted to or otherwise coupled to the workstation. In one example, the power receptacle assembly 10 is mounted to an under side of the work station such that work station is not cluttered by the power receptacle assembly 10. In another example, the power receptacle assembly 10 is mounted adjacent to the surface of the workstation. It is also contemplated that the power receptacle assembly 10 may be mounted on the surface of the workstation or another location with easy access to the power receptacle assembly 10 for a user.

The power receptacle assembly 10 includes a base unit 12, best shown in FIGS. 1A-1D, including a base housing 14. The housing 14 may be comprised of a metallic material such that the housing 14 is configured to provide grounding for the power receptacle assembly 10. The housing 14 includes a bottom structure or bottom housing 16 having a rectangular portion 18 with first and second sidewall extending therefrom on opposite ends of the rectangular portion 18. The first and second side walls 20, 22 may include one or more apertures 24 configured to have additional components of the power receptacle assembly 10 disposed there through, as shown in the Figures and described in more detail below. In the example shown in the Figures, each of the first and second side walls 20, 22 includes five apertures 24, however, the quantity and shape of the apertures 24 may be customized to any number or shape corresponding to the desired additional components disposed there though. In the example shown in the Figures, the first and second side walls 20, 22 as formed as a solid integral piece with the rectangular portion 18 forming the bottom housing 16. However, it is contemplated that one or more of the first and second side walls 20, 22 may also include a lip configured to be coupled to the rectangular portion 18 of the bottom housing 16 using fasteners disposed through the lip and the rectangular portion 18. It is also contemplated that one or more of the first and second side walls 20, 22 are coupled to the rectangular portion 18 in another way including but not limited to using adhesives or a welding process. As best shown in the Figures, the first and second side walls 20, 22 also include a top lip 26 disposed parallel and spaced from the rectangular portion 18.

Moreover, the housing 14 also includes a housing cover 28 configured to be coupled to the bottom housing 16, and more specifically, to the first and second side walls 20, 22 of the bottom housing 16. In the example shown, the housing cover 28 is coupled to the first and second side walls 20, 22 using fasteners disposed through the lip of the first and second side walls 20, 22 and the housing cover 28. However, it is also contemplated that the housing cover 28 may be formed as a solid integral piece with one or more of the first and second side walls 20, 22 and/or the rectangular portion 18 of the bottom housing 16. Moreover, the housing cover 28 may be coupled to the bottom housing 16 by another method including but not limited to using adhesives or a welding process.

The housing 14 also includes first and second end caps 30, 32 coupled to both the bottom housing 16 and the housing cover 28 such that the bottom housing 16, the housing cover 28, and the first and second endcaps define a housing interior 34. Moreover, the first and second end caps 30, 32 are configured to be coupled to the work station. In the example shown in the Figures, the first and second endcaps include a flange 36 extending parallel to the housing cover 28. In the example shown, the flange 36 is configured to be coupled to the underside of the work station using fasteners disposed there though, however, the flange 36 may also be configured to be disposed on or around another location with proximity to the work station. In one example, the first and second end caps 30, 32 are comprised of extruded metal or metallic material such that the first and second end caps 30, 32 have a continuous cross-sectional shape. As shown in the Figures, the continuous cross-sectional shape may be a C-shape, however, other variations have been contemplated. The first and second end caps 30, 32 may alternatively be comprised of another material including but not limited to a plastic polymer, composite, wood, or cork. In the example illustrated, the first and second end caps 30, 32 are identical, however, the first or second endcaps may be different shapes, sizes, or comprised of different materials, if desired.

The base unit 12 also includes a constant voltage driver 40 disposed within the housing interior 34. In one example, the constant voltage driver 40 is configured to transform input 120V AC current into an output of 24V DC current. It is also contemplated that the constant voltage driver 40 may have an output of 12V DC, if desired. The constant voltage driver 40 may also include an internal breaker configured to shut down power if any shorts and/or overloads are detected. In one example, the constant voltage driver 40 is Keystone product KTLD-100-UV-24V, however various other constant voltage drivers 40 have been contemplated. Moreover, in the example shown in the Figures, the constant voltage driver 40 is a pair of constant voltage drivers, i.e. a first constant voltage driver 42 and a second constant voltage driver 44, with both the first and second constant voltage drivers 42, 44 being disposed within the housing interior 34. It is also contemplated that the power receptacle assembly 10 may include more constant voltage drivers 40 which may or may not be disposed within the housing interior 34.

Figure 1C:
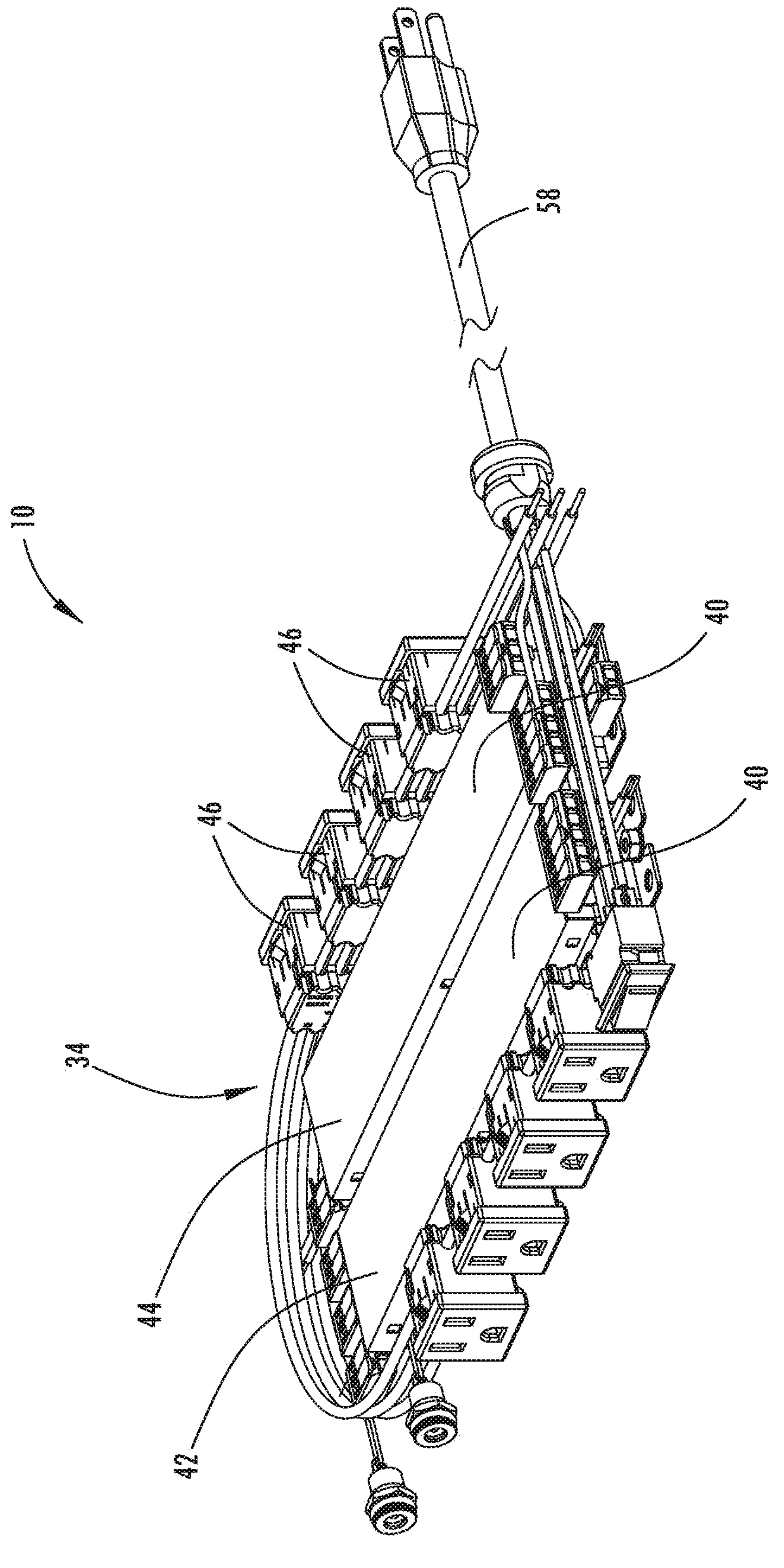
FIG. 1C is a perspective view of base unit of FIG. A1 having the housing, the face plate, and the back plate removed for visibility purposes.
Figure 1D:
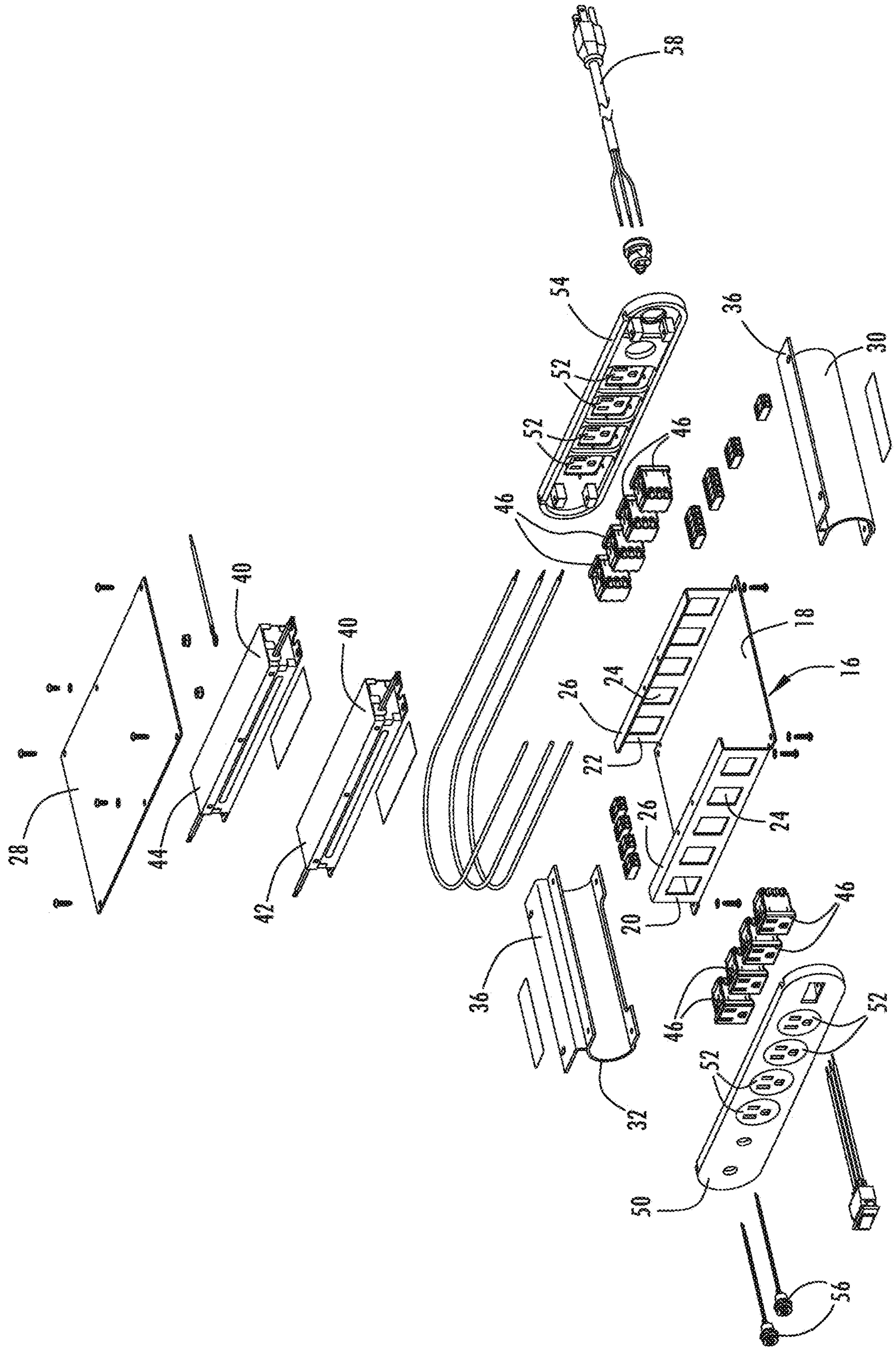
FIG. 1D is an exploded view of the base unit of FIG. 1A.

As best shown in FIG. 1C and 1D, the power receptacle assembly 10 also includes a plurality of power receptacles 46 electronically coupled to the constant voltage driver 40 though the housing 14. In the example shown, the power receptacles 46 are disposed through the apertures 24 of the first and second side walls 20, 22. Additionally, the plurality of power receptacles 46 are electronically coupled to the constant voltage drivers 40 such that the output of the power receptacles 46 matches the output of the constant voltage driver 40. In the example shown, the power receptacle assembly 10 includes eight power receptacles 46, four disposed in the apertures 24 in the first side walls 20 of the housing 14 and four disposed in the apertures 24 in the second sidewall of the housing 14. However, it is also contemplated that the power receptacle assembly 10 may have more or less power receptacles 46, as desired. In one example, the plurality of power receptacles 46 are connected to one another in series, however, it is also contemplated that the plurality of power receptacles 46 may be connected to one another in parallel. In one example, the one of the first or second power receptacles is an AC power receptacle and the other one of the first or second power receptacles is a DC power receptacle which are both powered using the constant voltage driver. In another example, the base unit includes a separator which insulates or physically separates the first and second power receptacles of the base unit.

The power receptacle assembly 10 also includes a face plate 50 coupled to the housing 14. The face plate 50 is configured to be coupled to one of the first or second sidewall. Moreover, the face plate 50 includes at least one first jack 52 which corresponds to the at least one power receptacle 46. In other words, when an electronic device is coupled to the power receptacle assembly 10, the user inserts prongs of an electrical plug into the first jack 52 which is coupled to the power receptacle and configured to move power to the electronic device. As shown in the Figures, the first jack 52 may be a plurality of jacks and each first jack 52 corresponds to the power receptacle 46 on a 1:1 ratio. It is also contemplated that the face plate 50 may also include a circuit breaker switch configured to interrupt electrical current if an overload or short is detected. It is also contemplated that the face plate 50 may also include an aperture for other electronic element or wires. The face plate 50 may be of any shape or size and may be made of a metallic material, a plastic polymer, wood, or another material, as desired.

The power receptacle assembly 10 also includes a back plate 54 coupled to the housing 14. The back plate 54 is configured to be coupled to one of the first or second sidewall, and opposite the face plate 50. Moreover, the back plate 54 also includes at least one second jack 56 which corresponds to the at least one power supply 40. In other words, when an electronic device is coupled to the power receptacle assembly 10, the user inserts prongs of an electrical plug into the second jack 56 which is coupled to the power receptacle 46 and configured to move power to the electronic device. As shown in the Figures, the second jack 56 may be a plurality of jacks and each first jack 52 corresponds to the power receptacle 46 on a 1:1 ratio. It is also contemplated that the back plate 54 may also include an aperture for other electronic element or wires. In one example, one or more of the first jack 52 or the second jack 56 may be a barrel connector having common dimensions. In one example, the size of the barrel connector corresponds to the amperage such that the larger the size the barrel connector, the more amperage the barrel connector is able to couple and transmit.

The power receptacle assembly 10 also includes a base power cord 58 configured to be coupled to a source of electrical power, such as standard wall power outlet or other source of electrical power. In the example shown in the Figures, the power cord 58 is electronically coupled through the back plate 54, however, it is contemplated that the power cord 58 may be electronically coupled in another location on the power receptacle assembly 10.

Figure 2A:
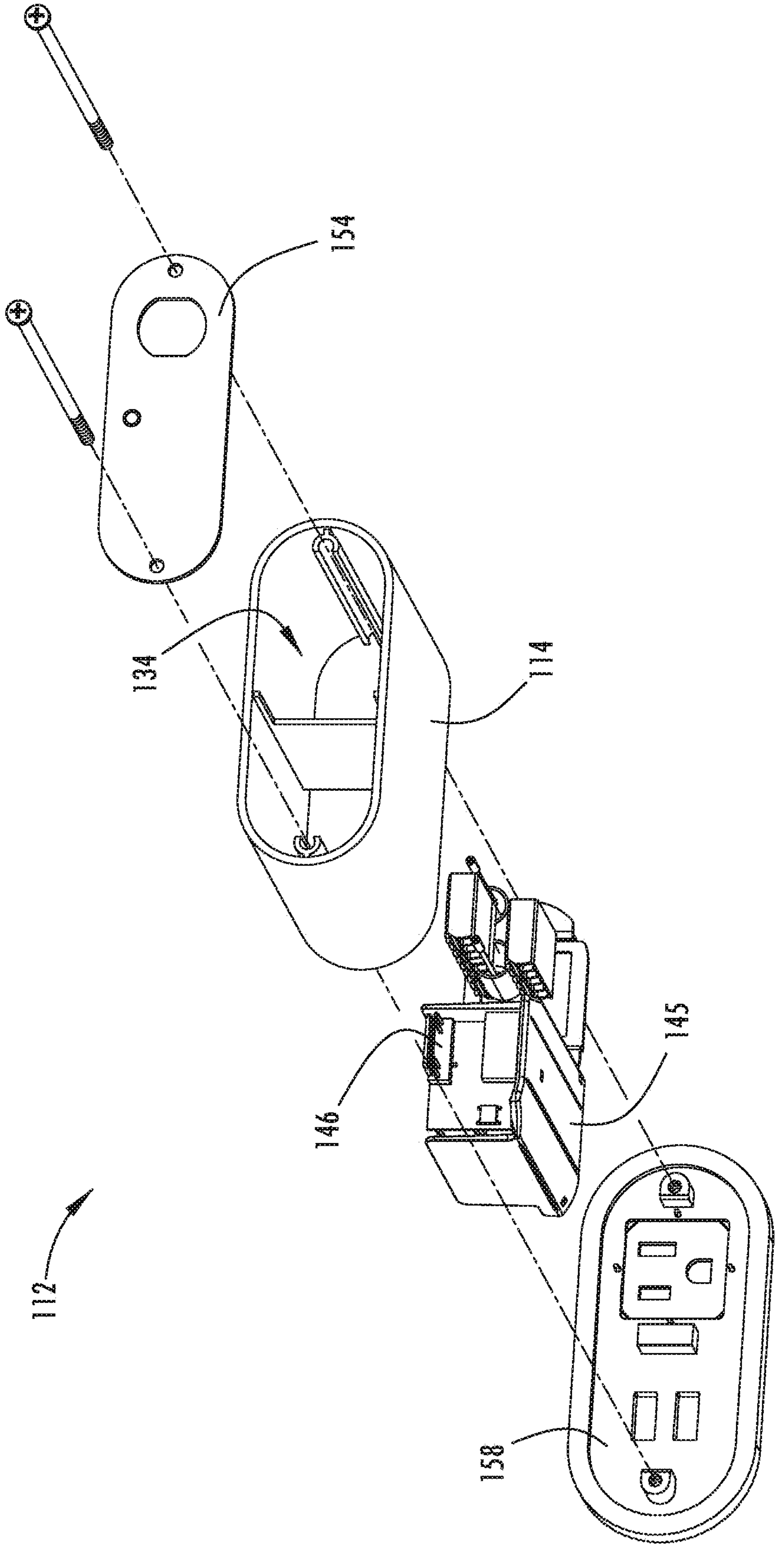
FIG. 2A is an exploded view of a secondary unit of the power receptacle assembly.
Figure 2B:
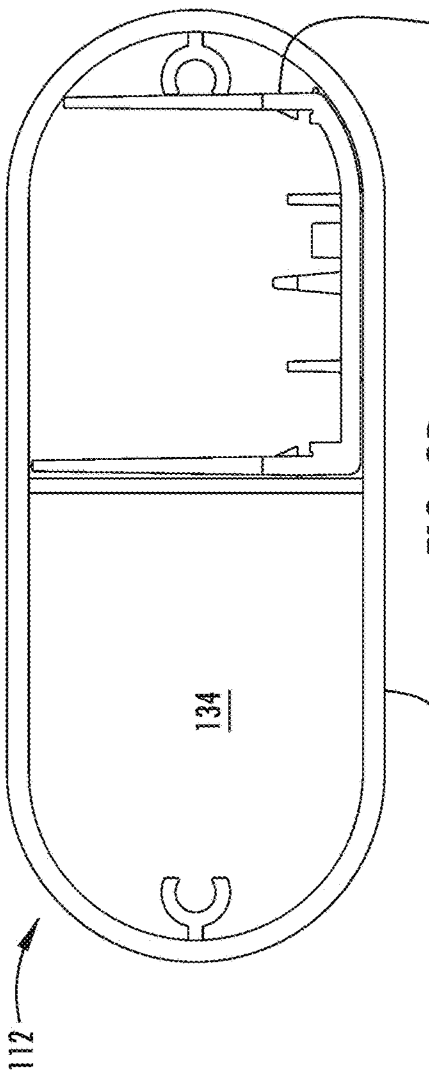
FIG. 2B is a cross-sectional view of the secondary unit of FIG. 2A.
Figure 2C:
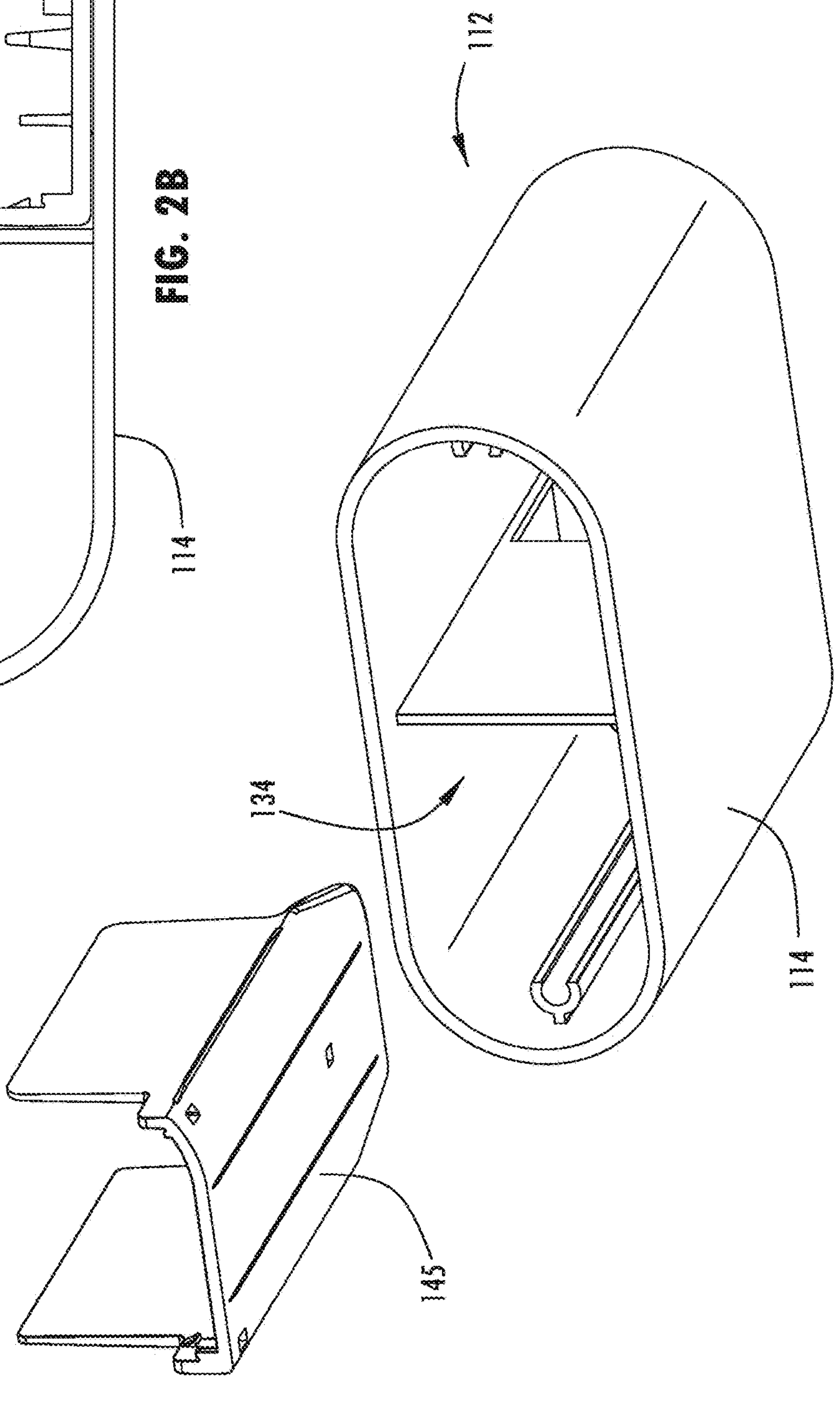
FIG. 2C is a partially exploded view of the secondary unit of FIG. 2A.
Figure 3A:
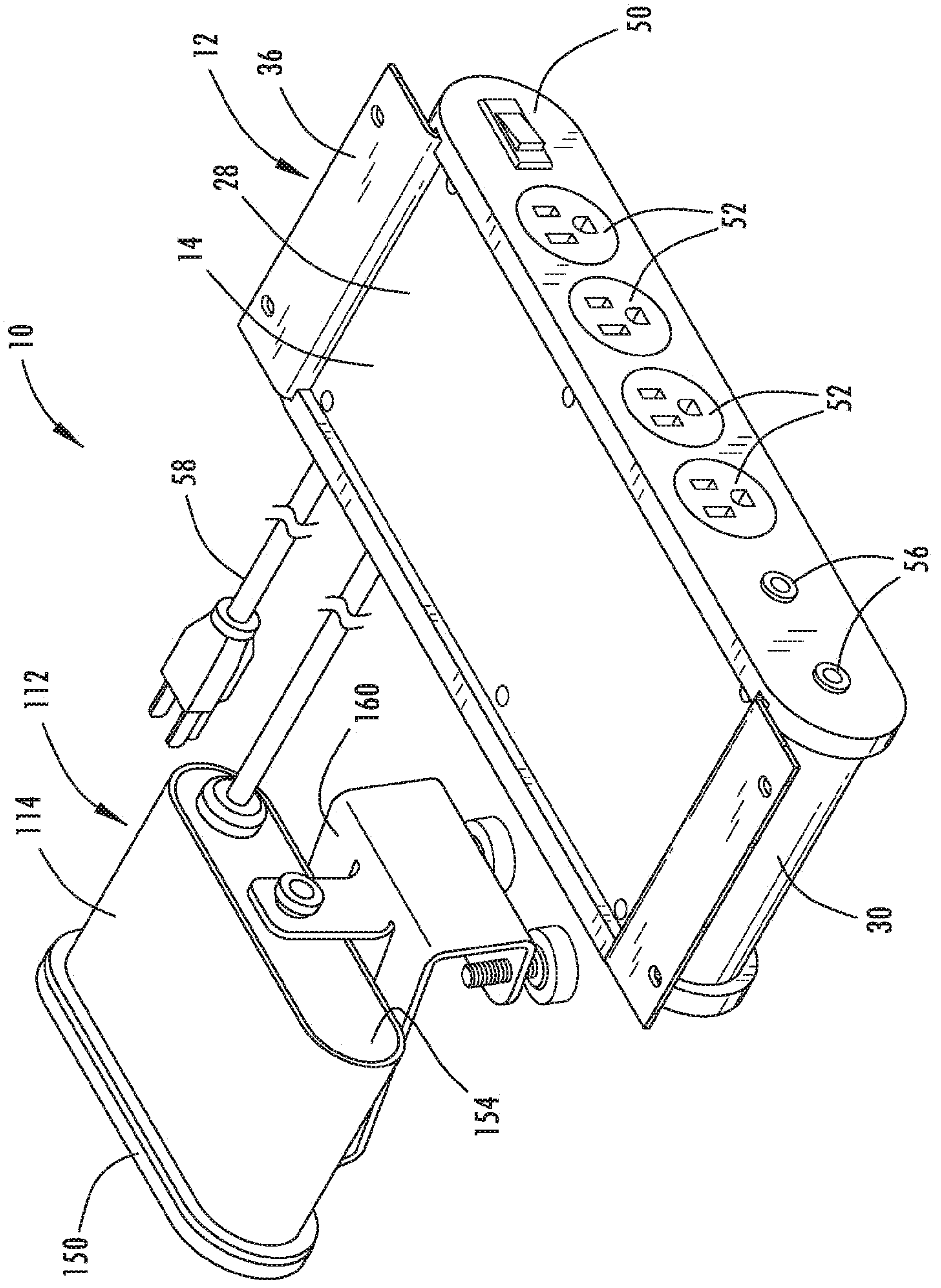
FIG. 3A is a front perspective view of the power receptacle assembly.
Figure 3B:
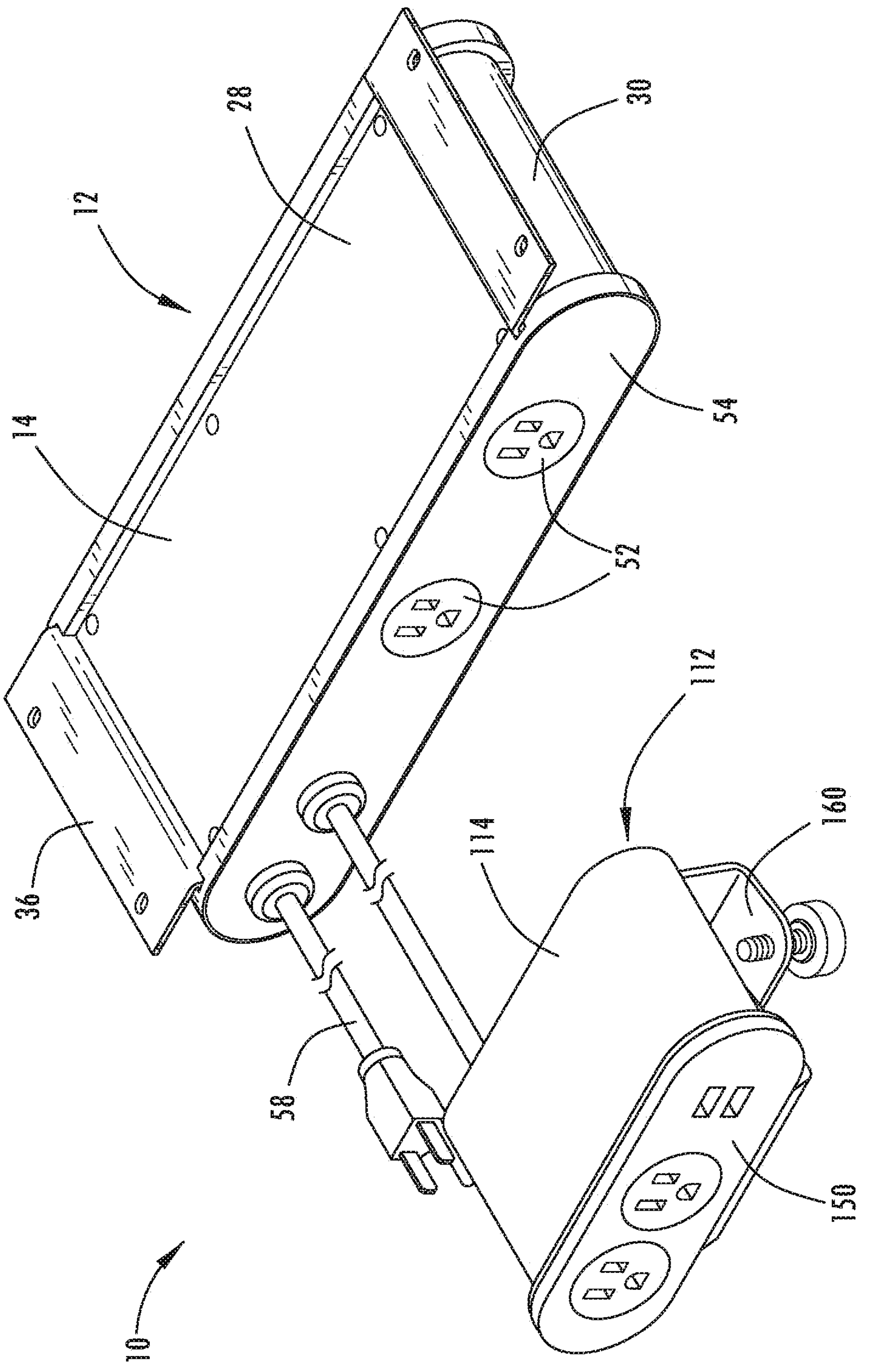
FIG. 3B is a rear perspective view of the power receptacle assembly.
Figure 3C:
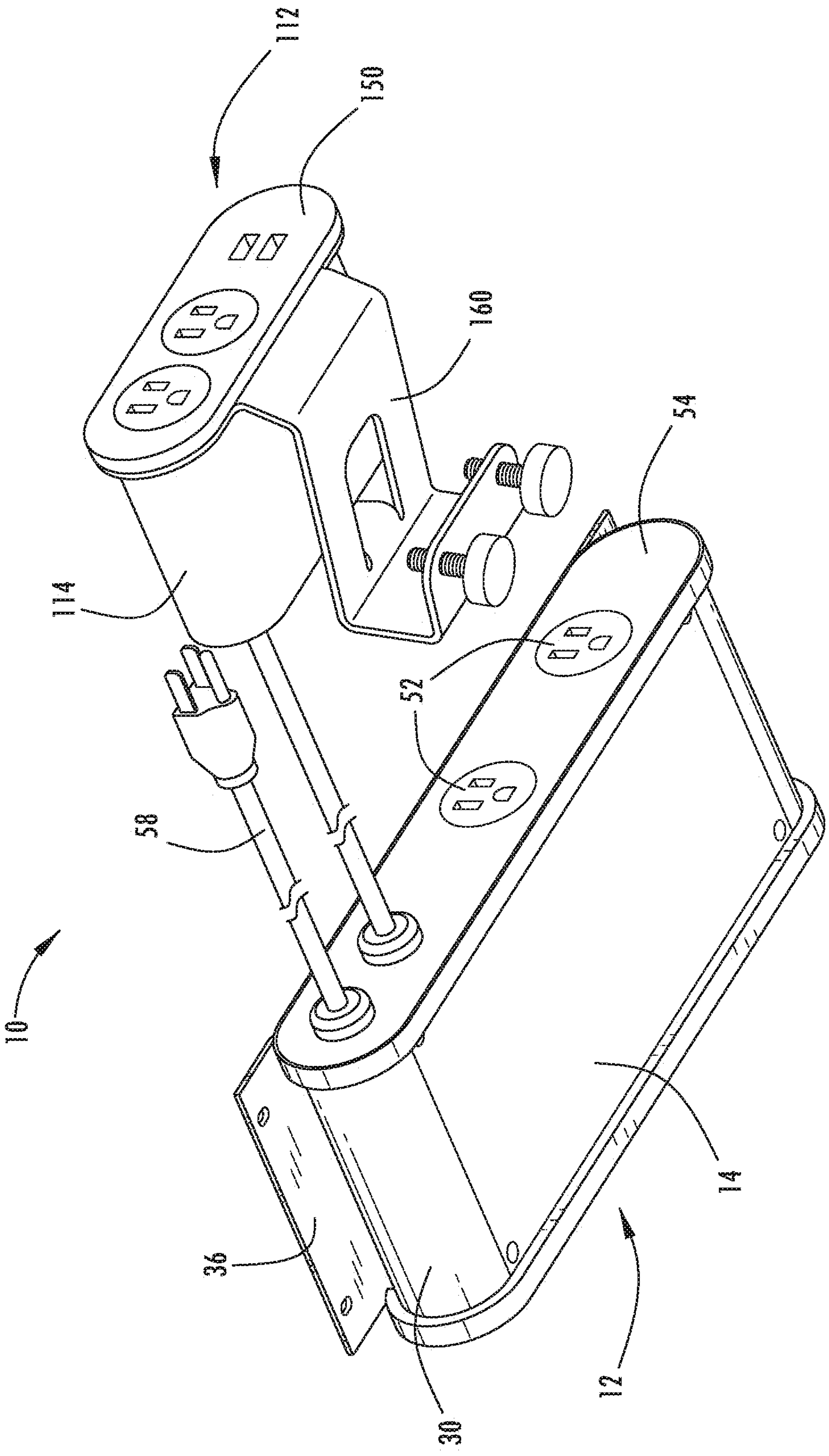
FIG. 3C is a bottom perspective view of the power receptacle assembly.
Figure 4A:
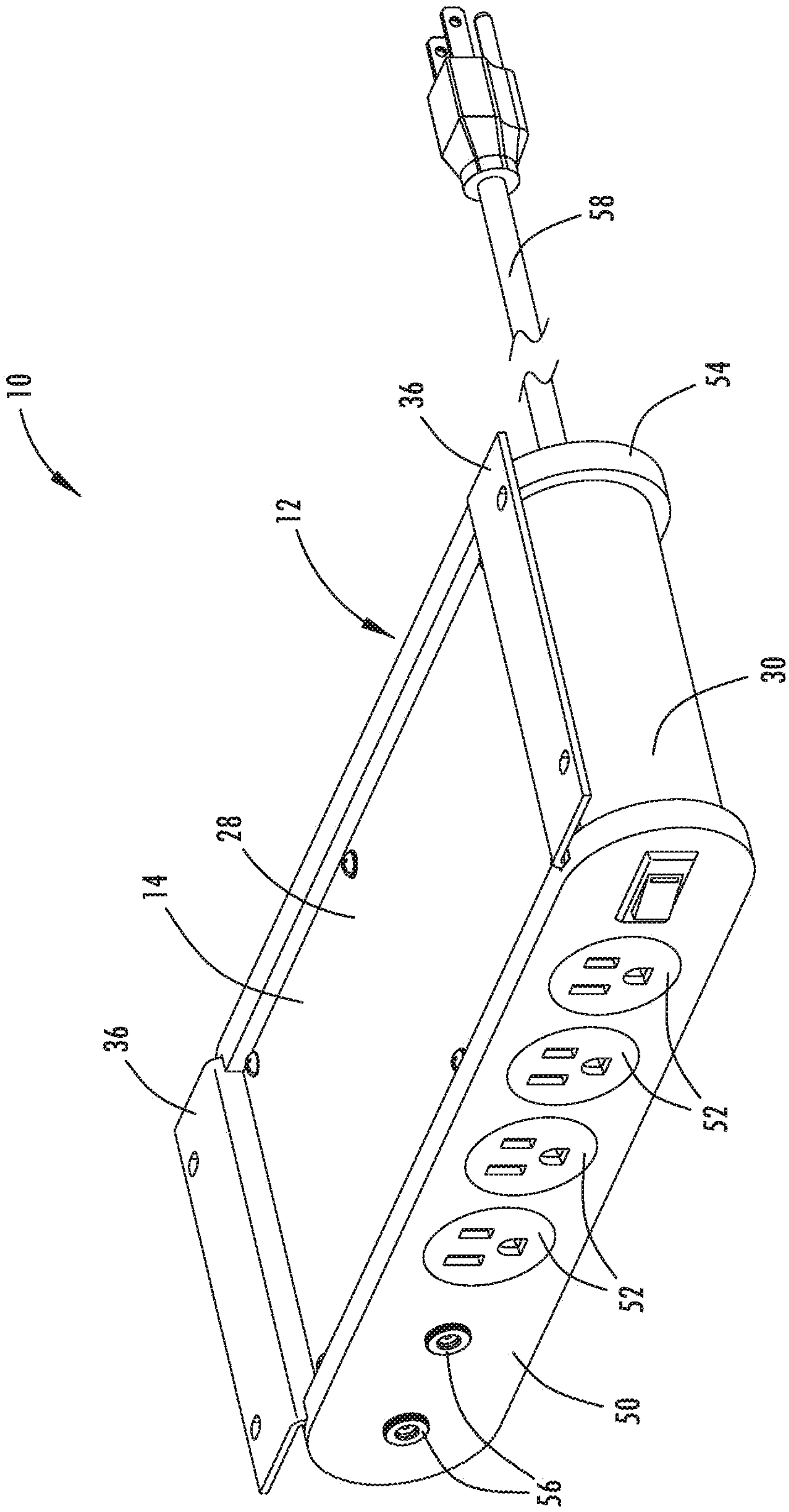
FIG. 4A is a front perspective view of another example of the power receptacle assembly.
Figure 4B:
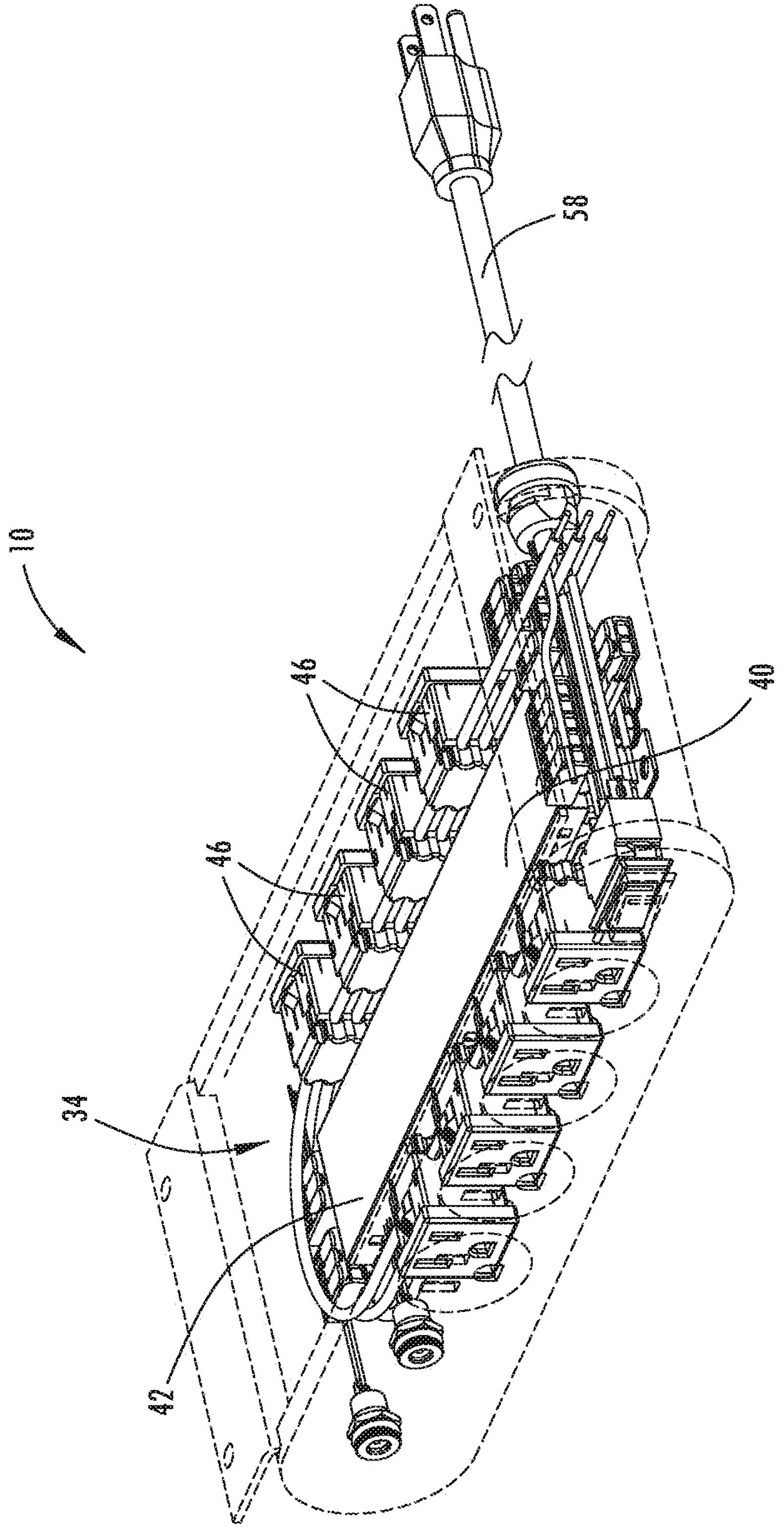
FIG. 4B is a front perspective view of the power receptacle assembly of FIG. 4A with the housing shown in phantom for viewing of internal components.
Figure 4C:
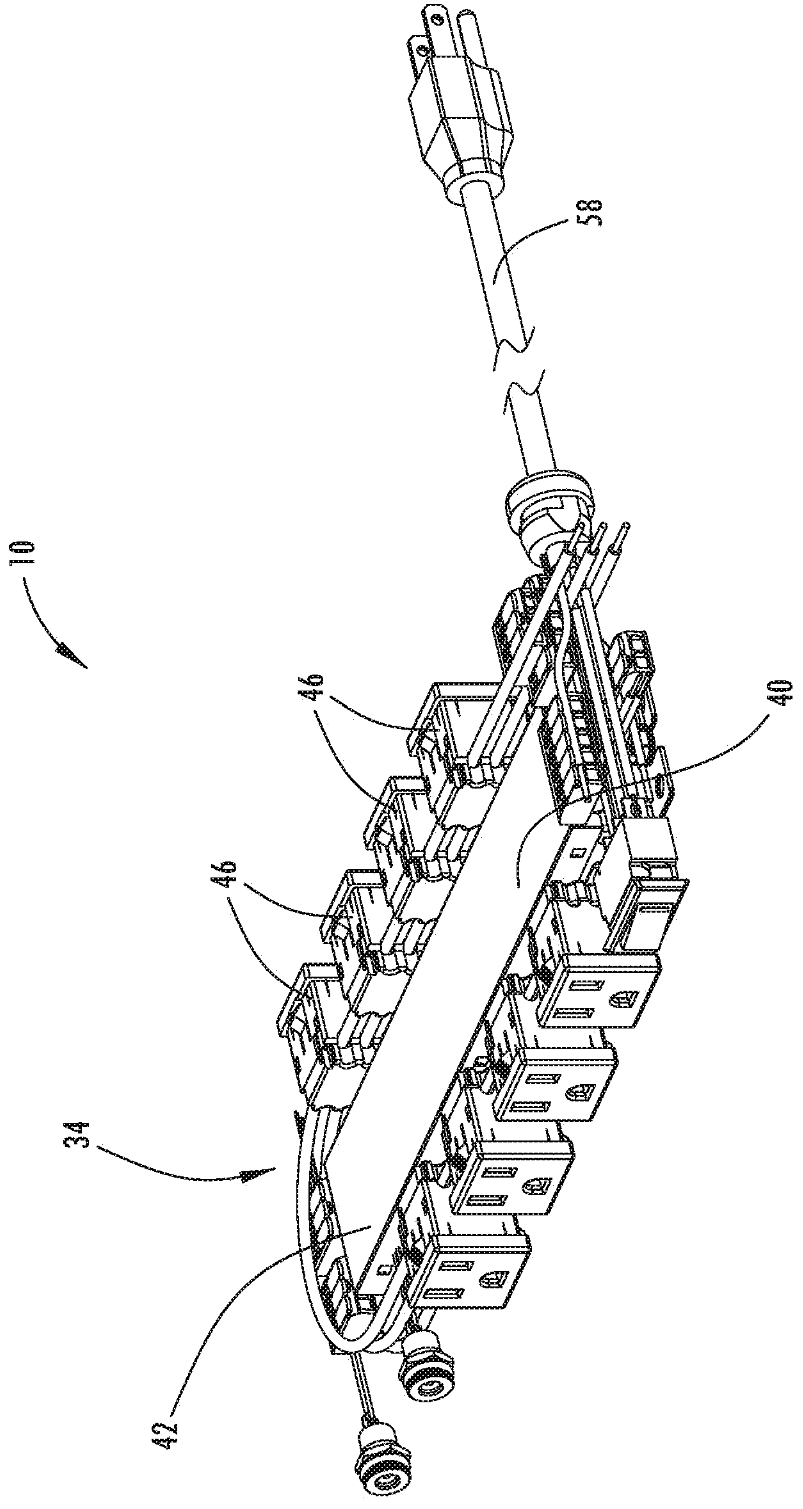
FIG. 4C is a front perspective view of the power receptacle assembly of FIG. 4A having the housing remove for viewing of internal components.

In some examples, the power receptacle assembly 10 may include a secondary unit 112 (see FIGS. 2A-2C) that is electrically coupled to the base unit 12, such that the receptacle assembly may be referred to as a multi-unit power receptacle assembly. The secondary unit 112 is configured to be mounted to a second location of the work station. In one example, the secondary unit 112 is configured to be mounted to a location that is accessible at or above the upper work surface of the work station the secondary unit 112. However, the secondary unit 112 may be mounted at any desired location at or near the work station for use with the work station. Moreover, the secondary unit 112 includes a secondary housing 114 defining a housing interior 134. The housing 114 may be similar to the housing 14 of the base unit 12 in material however, in the example shown in FIG. the housing 114 of the secondary unit 112 is generally smaller and is a single-piece housing not including endcaps. However, it is contemplated that the housing 114 of the secondary unit 112 may be similar or the same as the base unit 12. In the example shown, the housing interior 134 is configured to have a sled 145 coupled to a power receptacle 146 disposed therein. In one example, the power receptacle 146 and the sled 145 have a snap-fit configuration, however, various other coupling configurations have been contemplated. Moreover, the power receptacle 146 is powered by the power source through the power cord 58 and the electrical connection between the base unit 12 and the secondary unit 112. In one example, the electrical connection between the base unit 12 and the secondary until 112 is a secondary power cord. Additionally, the power receptacle 146 may comprise multiple power receptacles 146 of any type including one or more universal serial bus (USB) receptacles powered by the power source and/or as described above with respect to the base unit 12.

Additionally, the secondary unit 112 includes a face plate 150 coupled to the housing of the secondary unit 112 and a back plate 154 coupled to the housing 114 of the secondary unit 112. One or more of the face plate 150 or the back plate 154 may include a third jack configured to be electrically coupled to the electrical receptacle and configured to provide power to the electronic device used with the work station. In one example, the third jack is configured to have a voltage of less than 50V. In another example, the third jack is configured to have a voltage of greater than 10V. In yet another example, the third jack is configured to have a voltage of greater than 20V. In yet another example, the third jack is configured to have a voltage of 20V-30V. In yet another example, the third jack is configured to have a voltage of approximately 24V. Moreover, in combination with or alternatively to any examples given above, the third jack may be DC jack configured to have a standard DC voltage, as desired. Additionally, the third jack may be sized appropriately in order to carry any of the voltages listed above, i.e. in some cases a larger dimensioned DC jack is configured to have more current than a smaller dimensioned DC jack. However, other configurations have been contemplated.

The secondary unit includes a secondary power cord extending through the secondary housing and electrically coupled between the secondary power receptacle and the constant voltage driver. In one example, the single constant voltage driver provides a power supply to the power receptacles located in both the base unit and in the secondary unit.

Additionally, the secondary unit 112 includes a clamp 160 coupled to the housing 114 and configured to secure the secondary unit 112 on the mounting surface of the work station. As described above, the secondary unit 112 may be configured to be mounted to a location that is accessible at or above the upper work surface of the work station the secondary unit 112. However, the secondary unit 112 may be mounted at any desired location at or near the work station for use with the work station. The clamp 160 may be comprised of the same material as the housing 114 or may be comprised of steel, plastic polymer or the like. Additionally, the clamp 160 may be a traditional C or G clamp, or may any other type of clamp configured to secure the secondary unit 112 to the work station.

Figure 5:
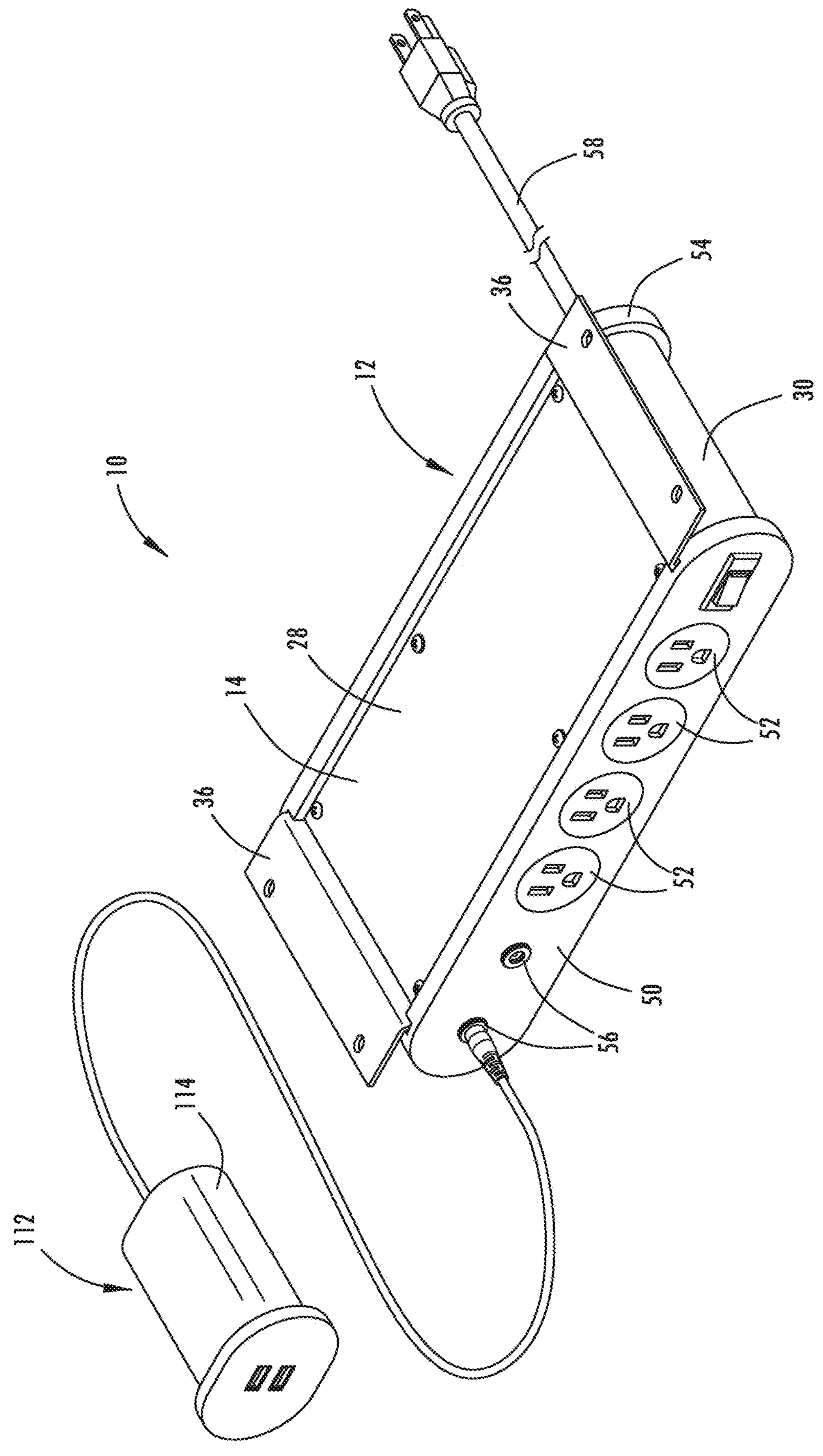
FIG. 5 is a front perspective view of another example of the power receptacle assembly.

In the example shown in FIG. 5, the secondary unit may be configured to have one or more power receptacles configured to engage a USB-C or similar device. In the example shown, the secondary unit is coupled through the second power receptacle which allows the secondary unit to be powered using the base unit.

The base unit 12 and the secondary unit 112 each provide power receptacles 46, 146 that are powered by the power source. In some examples, the base unit includes a power supply, such as an AC/DC converter, that operates to covert line voltage (e.g., 120V or 240V) to a low voltage output (e.g., 20V or 5V), such as to be capable of powering a connected device via a universal serial bus (USB) receptacle connection. In other words, the power supply may convert conventional high-voltage power, such as 120V or 240V, to conventional low-voltage power, such as 20V or 5V or the like. The power supply may be electrically connected with a low voltage power receptacle 146 at the base unit 12 or at the secondary unit 112. Having the power supply integrated into the housing 114 provides the power supply in an easy to mount housing providing a compact and enhanced performance power of the power receptacle assembly 10.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

Furthermore, to the extent that the terms "includes," "has," or "having" or variations in form thereof are used in either the detailed description or the claims, such terms are intended to be inclusive in a manner similar to the term "comprising" as "comprising" is interpreted when employed as a transitional word in a claim.

It is also to be understood that the specific devices and processes illustrated in the attached drawings and described in this specification are examples of aspects of the inventive concepts defined in the appended claims. Hence, specific dimensions and other physical characteristics relating to the examples disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed:

1. A power receptacle assembly, comprising:

a housing comprising:

a housing component with a bottom structure;

first and second end caps coupled to opposing ends of the housing component, the first and second end caps each having a flange integrally extending therefrom and configured to be attached to an underside of a work station;

a face plate connected to a front portion of the housing component, wherein the face plate includes a plurality of apertures; and a back plate connected to a back portion of the housing component, wherein the housing component, the first and second end caps, the face plate, and the back plate together define a housing interior;

a plurality of power receptacles disposed in the housing interior and electronically coupled to a constant voltage driver, wherein the plurality of power receptacles have connection openings aligned with the plurality of apertures in the face plate for receiving an electrical plug through the corresponding aperture into the corresponding power receptacle; and a power cord extending through the housing and configured to be coupled to a power source, wherein the power cord is electronically coupled to the plurality of power receptacles to deliver power from the power source to the plurality of power receptacles.

2. The power receptacle assembly of claim 1, wherein a housing cover is coupled to the first and second end caps.

3. The power receptacle assembly of claim 1, wherein the back plate is coupled with the first and second end caps and the bottom structure.

4. The power receptacle assembly of claim 1, wherein the face plate is coupled with a front edge of the first and second end caps and the bottom structure.

5. The power receptacle assembly of claim 1, wherein the first and second end caps are coupled to the bottom structure and a housing cover to surround the housing interior.

6. The power receptacle assembly of claim 1, wherein the plurality of power receptacles includes at least one of an AC or a DC power receptacle.

7. The power receptacle assembly of claim 1, wherein the plurality of power receptacles includes a USB power receptacle.

8. The power receptacle assembly of claim 1, wherein power that is output by the plurality of power receptacles matches power output by the constant voltage driver.

9. A power receptacle assembly, comprising:

a housing component defining a bottom side or a top side of a housing interior;

first and second end caps disposed at opposing ends of the housing component to define respective ends of the housing interior, the first and second end caps each having an integrated flange along a depth of the housing component that is configured to be attached to an underside of a work station;

a face plate disposed at a front portion of the housing component to define a front side of the housing interior, the face plate coupled to the housing component and the first and second end caps;

a back plate disposed at a back portion of the housing component to define a back side of the housing interior, the back plate coupled to the housing component and the first and second end caps;

a power receptacle disposed in the housing interior, wherein the power receptacle is aligned with an aperture in the face plate for receiving an electrical plug through the aperture; and a power cord extending through the back plate and into the housing, wherein the power cord electrically connects to the power receptacle and is configured to be electrically connected to a power source.

10. The power receptacle assembly of claim 9, wherein the power receptacle is a DC power receptacle or a USB power receptacle.

11. The power receptacle assembly of claim 9, wherein the power receptacle is electronically coupled to a constant voltage driver disposed in the housing.

12. The power receptacle assembly of claim 11, wherein the constant voltage driver is configured to output the same power that is output by the power receptacle.

13. The power receptacle assembly of claim 9, wherein the housing includes first and second side walls extending from a bottom structure.

14. The power receptacle assembly of claim 13, wherein the first and second side walls extend between the face plate and the back plate.

* * * * *